United States Patent
Firestone

[15] 3,679,711
[45] July 25, 1972

[54] METHOD OF PREPARING (CIS-1,2-EPOXYPROPYL)PHOSPHONIC ACID ESTERS

[72] Inventor: Raymond A. Firestone, Fanwood, N.J.
[73] Assignee: Merck & Co., Inc., Rahway, N.J.
[22] Filed: Jan. 27, 1969
[21] Appl. No.: 794,385

[52] U.S. Cl. ..........................................260/348 R, 424/203
[51] Int. Cl. ..........................................C07f 9/40
[58] Field of Search..................................260/348

[56] References Cited

OTHER PUBLICATIONS

Houben–Weyl, Methoden der Organischen Chemie, Vol. 12/1 (1963) pp. 491, 495.

Primary Examiner—Norma S. Milestone
Attorney—Joseph W. Molasky, J. Jerome Behan and I. Louis Wolk

[57] ABSTRACT

A method for the preparation of (cis-1,2-epoxypropyl)-phosphonic acid and its salts and ester derivatives which comprises treating a propionaldehyde substituted in the 2-position by a leaving group with: (1) an alkali metal dihydrocarbylphosphite, (2) a trihydrocarbylphosphite or (3) a di-alkali metal phosphite. Suitable leaving groups include halogen, alkarylsufonyloxy, alkanesulfonyloxy or a sulfonium, sulfoxonium, ammonium or phosphonium cation. The (cis-1,2-epoxypropyl)phosphonic acid product thus obtained and its salts are antibiotics which have utility as antibacterials in inhibiting the growth of gram-negative and gram-positive pathogenic bacteria.

3 Claims, No Drawings

METHOD OF PREPARING (CIS-1,2-EPOXYPROPYL)PHOSPHONIC ACID ESTERS

This invention relates to a novel method for the preparation of (cis-1,2-epoxypropyl)phosphonic acid and the salt and ester derivatives thereof via the reaction of a propionaldehyde with an appropriately substituted phosphite.

The (±) and (−)(cis-1,2-epoxypropyl)phosphonic acid product of the instant process and its salts are antimicrobial agents, which are useful in inhibiting the growth of gram-positive and gram-negative pathogenic bacteria. The (−) form, and particularly its salts such as the sodium and calcium salts, are active against Bacillus, Escherichia, Staphylococci, Salmonella and Proteus pathogens, and antibiotic-resistant strains thereof. Illustrative of such pathogens are *Bacillus subtilis, Escherichia coli, Salmonella schottmuelleri, Salmonella gallinarum, Salmonella pullorum, Proteus vulgaris, Proteus mirabilis, Proteus morganii, Staphylococcus aureus* and *Staphylococcus pyogenes*. Thus, (±) and (−)(cis-1,2-epoxypropyl)phosphonic acid and the salts thereof can be used as antiseptic agents to remove susceptible organisms from pharmaceutical, dental and medical equipment and can also be used in other areas subject to infection by such organisms. Similarly, they can be used to separate certain micro-organisms from mixtures of microorganisms. The salts of (−)(cis-1,2-epoxypropyl)phosphonic acid are particularly valuable because not only do they have application in the treatment of diseases caused by bacterial infections in man and animals, but they are active against resistant strains of pathogens. The said salts constitute a preferred embodiment of this invention because they are effective when given orally, although it is to be noted that they can also be administered parenterally.

In accordance with this invention (cis-1,2-epoxypropyl)phosphonic acid and its salts and ester derivatives (I, infra) are obtained by the reaction of a propionaldehyde substituted in the 2-position by a leaving group with either (1) a trihydrocarbylphosphite (II, infra) such as a trialkylphosphite or with (2) an alkali metal dihydrocarbylphosphite or tri-alkali metal phosphonate (III, infra) as, for example, with a sodium- or potassium dialkylphosphite or trisodium-, tripotassium- or trilithium phosphonate. In principle, the process can be effected by simply adding the propionaldehyde to the appropriate phosphite, either in the presence or in the absence of a suitable solvent such as ether. Following the addition of the propionaldehyde to the phosphite reactant it is usually desirable to facilitate the reaction by the application of heat as, for example, by heating the mixture at its reflux temperature. The (cis-1,2-epoxypropyl)phosphonic acid ester (I) thus obtained can either be isolated per se as a product of the invention or the said ester may be converted to (cis-1,2-epoxypropyl)phosphonic acid or its salts by any suitable means as, for example, by hydrogenolysis or by treatment with an aqueous solution of an acid under carefully buffered conditions or by treatment with an aqueous solution of a base or via the reaction of the said esters with trimethylchlorosilane followed by aqueous hydrolysis. The following equations illustrate the process of this invention.

(1)

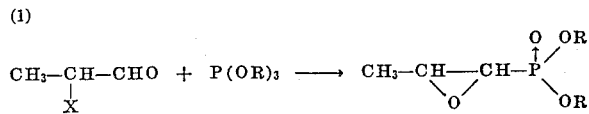

(2)

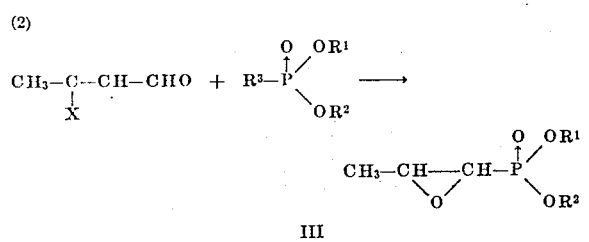

wherein R is an hydrocarbyl radical such as alkyl, for example, lower alkyl as illustrated by methyl, ethyl and the like or aryl, for example, mononuclear aryl such as phenyl; $R^1$ and $R^2$ represent similar or dissimilar hydrocarbyl moieties, i.e., organic radicals composed solely of carbon and hydrogen such as alkyl, for example, lower alkyl, namely, methyl, ethyl, n-propyl, n-butyl, pentyl and the like, aryl, for example, mononuclear aryl such as phenyl and the like or aralkyl for example, mononuclear lower aralkyl such as benzyl, phenethyl and the like or an alkali metal cation such as sodium or potassium cation or, taken together, an alkaline earth metal cation as, for example, a calcium or magnesium cation; $R^3$ is the cation derived from an alkali metal as, for example, a sodium, potassium, or lithium cation, and X is halo such as chloro, bromo, fluoro or iodo, hydroxy, alkarylsulfonyloxy, for example, mononuclear lower alkarylsulfonyloxy such as para-toluenesulfonyloxy, and the like, alkanesulfonyloxy such as lower alkanesulfonyloxy, for example, methanesulfonyloxy, ethanesulfonyloxy and the like; a sulfonium cation of the formula $(R^4)_2S^{\oplus}$, a sulfoxonium cation of the formula $(R^4)_2SO^{\oplus}$, an ammonium cation of the formula $(R^4)_3N^{\oplus}$ or a phosphonium cation of the formula $(R^4)_3P^{\oplus}$, wherein $R^4$ in each occurrence is alkyl, for example, lower alkyl such as methyl, ethyl, n-propyl and the like.

Planar formula III, supra, is one or two tautomeric structures by which the tri-alkali metal phosphonate reactants of this invention may be illustrated, however, it will be appreciated by those skilled in the art that because of tautomerization the said phosphonates III may also be depicted as tri-alkali metal phosphite (IIIa, infra);

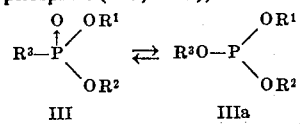

wherein $R^1$, $R^2$ and $R^3$ are as defined above. In this specification both the pentavalent phosphonates (III) and the trivalent phosphites (IIIa) are meant to be included. The instant process is capable of wide modification and it should be apparent to one of ordinary skill that the use of a tautomeric reactant in an otherwise similar process is within the skill of the artisan to select and does not constitute a departure from this invention.

The propionaldehyde and phosphite starting materials may be reacted directly to afford the (cis-1,2-epoxypropyl)phosphonic acid product or its corresponding salt or ester derivative or, alternatively, the alkali metal phosphite reactant may be prepared in situ via the reaction of a suitable phosphonate or phosphorous acid with an appropriate metallic reagent such as an alkali metal, an alkali metal hydride or alkali metal hydroxide and the like. THe alkali metal phosphite and tri-alkali metal phosphonate derivatives thus obtained are generally of sufficient purity as to be usable directly without isolation and purification as starting materials in the process of this invention. The following equation wherein sodium hydride is the metallic reagent employed illustrates this method of preparation; however, it is to be understood that other functionally equivalent reagents such as potassium metal, potassium hydride, lithium hydride, sodium hydroxide, potassium hydroxide and the like may be substituted therefor in an otherwise analogous synthesis to obtain the corresponding alkali metal phosphite reactants:

(1)

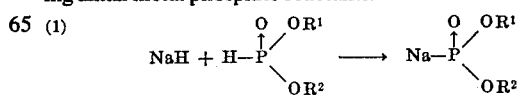

(2)

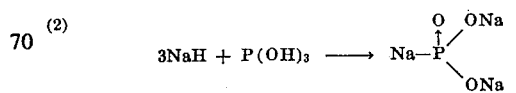

wherein $R^1$ and $R^2$ are as defined above.

The method by which the ester products of this invention may be converted to (cis-1,2-epoxypropyl)-phosphonic acid and the salts thereof include hydrolytic means such as comprises treating the said esters with an aqueous solution of an acid such as hydrochloric acid or sulfuric acid under carefully buffered conditions or with an aqueous solution of a base such as an alkali metal or alkaline earth metal carbonate, bicarbonate, oxide or hydroxide or, alternatively, by treatment with trimethylchlorosilane followed by aqueous hydrolysis; or by hydrogenolysis; or via the application of suitable reductive, displacement or oxidative means; or by treatment of the said esters with a photochemical agent. The choice of a suitable method for the conversion of the said esters to (cis-1,2-epoxypropyl)phosphonic acid or its salts depends to a large extent upon the character of the ester moiety comprising the phosphonate portion of the molecule. For example, when the ester is a dimethyl ester, the conversion to (cis-1,2-epoxypropyl)-phosphonic acid is most advantageously conducted by treating the said ester with trimethylchlorosilane followed by the aqueous hydrolysis of the silane ester intermediate thus obtained to the free acid. The methyl silane ester interchange is accomplished by refluxing the silane compound, such as chlorotrimethylsilane, with the methyl ester in an inorganic solvent such as hexane, benzene and the like. In addition to the foregoing, the alkyl esters of (cis-1,2-epoxypropyl)phosphonic acid and the aryl analogs thereof, including esters of mixed function such as (cis-1,2-epoxypropyl)phosphonate wherein one ester moiety is derived from an alkanol and the remaining ester moiety is derived from phenol, naphthol and the like, may be converted to the free acid by alkaline hydrolysis. However, in view of the high degree of stability of the dialkyl esters it is not uncommon to find that the treatment of a dialkyl (cis-1,2-epoxypropyl)phosphonate with an aqueous solution of a base usually affords the monoalkyl ester intermediate and, therefore, the ultimate conversion of the alkyl diester to the salt or free acid necessitates a second step, such as treatment with a photochemical agent or an acidic reagent in order to effect the removal of the remaining alkyl ester moiety.

The nuclear carbons comprising the epoxide ring in the instant products are asymmetric in character and, therefore, the said products may be obtained in the form of one or more of four optically active isomers. In this connection it should be noted that (−)(cis-1,2-epoxypropyl)phosphonic acid and its salts are particularly effective in inhibiting the growth of pathogenic bacteria and, therefore, the preparation of that isomer constitutes a preferred embodiment of this invention.

The said (−)(cis-1,2-epoxypropyl)phosphonic acid and its salts rotate plane-polarized light in a counterclockwise direction (to the left as viewed by the observer) when the rotation of its disodium salt is measured in water (5 percent concentration) as 405 m$\mu$.

The designation cis used in describing the 1,2-epoxypropylphosphonic acid compounds means that each of the hydrogen atoms attached to carbon atoms 1 and 2 of the propylphosphonic acid are on the same side of the oxide ring.

The following examples illustrate the method by which (cis-1,2-epoxypropyl)phosphonic acid and its salts and ester derivatives (I) may be obtained. However, the examples are illustrative only and should not be construed as being limited thereto since other functionally equivalent reagents may be substituted therefor to yield an identical (cis-1,2-epoxypropyl)phosphonic acid and its salt and ester derivatives.

It should be noted that the instant prOcess is intended to include other functionally equivalent methods of preparation. Therefore, any modification of this synthesis which results in the formation of an identical product should be construed as constituting an analogous method. The claimed process is capable of wide variation and modification and, therefore, any minor departure therefrom or extensions thereof is considered as being within the skill of the artisan and as falling within the scope of this invention.

EXAMPLE 1

Diethyl Ester of (Cis-1,2-epoxypropyl)phosphonic Acid

To a suspension of sodium diethylphosphite (40.0 g.) in ether (200 ml.) is added slowly a solution of one equivalent of 2-chloropropionaldehyde in ether (40 ml.) with cooling. The reaction mixture is refluxed several hours and the mixture is then filtered to remove sodium chloride, the ether is evaporated and the resulting product is vacuum distilled to afford the diethyl ester of (cis-1,2-epoxypropyl)phosphonic acid.

EXAMPLE 2

Diethyl Ester of (−)(Cis-1,2-epoxypropyl)phosphonic Acid
  Step A: (R)-2-tosyloxypropionaldehyde To a mixture of (R)-2-hydroxypropionaldehyde (10 g.) in tetrahydrofuran (100 ml.) is added one equivalent of pyridine and then, with cooling and stirring over one-half hour, one equivalent of para-toluenesulfonyl chloride. The sOlvent is evaporated in vacuo and replaced with ether. The ether solution is then washed successively with water, dilute aqueous hydrochloric acid and dilute aqueous bicarbonate. After drying with sodium sulfate, the ether is removed to afford (R)-2-tosyloxypropionaldehyde.
  Step B: Diethyl Ester of (−)(Cis-1,2-epoxypropyl)phosphonic Acid By substituting (R)-2-tosyloxypropionaldehyde for the 2-chloropropionaldehyde recited in Example 1 and following substantially the procedure recited therein, there is thus obtained the diethyl ester of (−)(cis-1,2-epoxypropyl)phosphonic acid.

EXAMPLE 3

(Cis-1,2-epoxypropyl)phosphonic Acid and Disodium Salt
  Step A: Dimethyl ester of (Cis-1,2-epoxypropyl)phosphonic Acid Equimolar amounts of 2-chloropropionaldehyde and trimethylphosphite are mixed together and heated slowly to 100° C. After 3 hours, the mixture is fractionally distilled in vacuo to afford the dimethyl ester of (cis-1,2-epoxypropyl)phosphonic acid.
  Step B: (Cis-1,2-epoxypropyl)phosphonic Acid and Disodium Salt Dimethyl ester of (cis-1,2-epoxypropyl)phosphonic acid (1 m. mole) in trimethylchlorosilane (10 cc.) is refluxed for 8 hours and the reaction mixture is extracted with water to yield an aqueous solution of (cis-1,2-epoxypropyl)phosphonic acid. The product thus obtained is then treated with two equivalents of sodium hydroxide and the solution evaporated to yield the disodium salt of (cis-1,2-epoxypropyl)phosphonic acid.

EXAMPLE 4

Calcium Salt of (±)(Cis-1,2-epoxypropyl)phosphonic Acid

One gram of phosphorous acid (1.0 g.) in hexamethylphosphoramide (25 ml.) is treated with three equivalents of sodium hydride. The trisodium phosphonate thus obtained is cooled at 10° C. and one equivalent of 2-chloropropionaldehyde is added dropwise slowly over 1 hour. THe mixture containing the disodium salt of (±)(cis-1,2-epoxypropyl)phosphonic acid thus obtained is stirred an additional hour at 25° C. and then diluted with an equal volume of water. Upon the addition of a one-half molar equivalent each of calcium chloride and calcium bicarbonate there is obtained a precipitate which is isolated by filtration to afford the calcium salt of (±)(cis-1,2-epoxypropyl)phosphonic acid.

In a manner similar to that described in Example 4, all of the products of this invention may be obtained. Thus, for example, by substituting the appropriate alkali metal hydride, substituted propionaldehyde and alkali metal or alkaline earth metal hydroxide for the sodium hydride, 2-chloropropionaldehyde, calcium chloride and calcium carbonate reactants recited therein, the corresponding salts of (cis-1,2-epoxypropyl)phosphonic acid may be obtained:

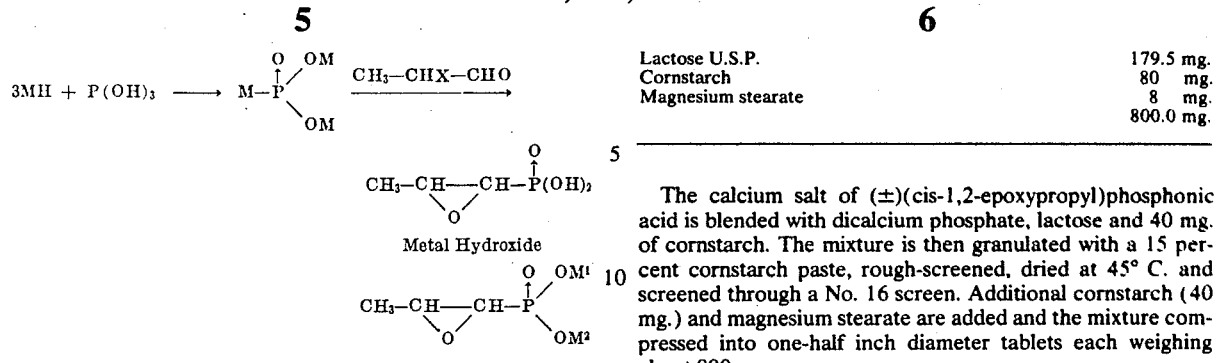

| Ex. | MH | M | X | M¹ | M² | Hydroxide |
|---|---|---|---|---|---|---|
| 5 | KH | K | —OSO₂—⟨C₆H₄⟩—CH₃ | K | K | KOH |
| 6 | NaH | Na | —S⁺(CH₃)₂ | —Mg— | | Mg(OH)₂ |
| 7 | LiH | Li | —OSO₂CH₃ | Na | Na | NaOH |
| 8 | NaH | Na | —SO⁺(CH₃)₂ | Li | Li | LiOH |
| 9 | KH | K | —P⁺(CH₃)₃ | Na | Na | NaOH |
| 10 | LiH | Li | —N⁺(CH₃)₃ | K | K | KOH |

The products of this invention can be administered in a wide variety of therapeutic dosages in conventional vehicles as, for example, by oral administration in the form of a capsule or tablet or in a liquid solution or suspension. Suitable formulations may include diluents, granulating agents, preservatives, binders, flavoring agents and coating agents which are well known to those skilled in this particular art and the dosage of the products may be varied over a wide range as, for example, in the range of from 1.0 grams to about 8.0 grams of active ingredient for the symptomatic adjustment of the dosage to the patient to be treated.

Alternatively, the instant products (I) may be administered parenterally by injection in a sterile excipient and for this purpose it is most desirable to employ a salt of (cis-1,2-epoxypropyl)phosphonic acid which is soluble in the liquid vehicle.

It is also within the scope of this invention to combine two or more of the instant products in a unit dosage form or to combine one or more of the instant products with other known antibacterial agents.

The following example illustrates the preparation of a representative dosage; it being understood that other salts of (cis-1,2-epoxypropyl)phosphonic acid and other pharmaceutical vehicles may be substituted for the active ingredient and excipients recited therein to obtain other suitably active dosage forms:

EXAMPLE 11

Tablets Containing 352.5 mg. of Active Ingredient Per Tablet

| | Per Tablet |
|---|---|
| Calcium salt of (±) (cis-1,2-epoxypropyl)phosphonic acid | 352.5 mg. |
| Dicalcium phosphate | 180 mg. |
| Lactose U.S.P. | 179.5 mg. |
| Cornstarch | 80 mg. |
| Magnesium stearate | 8 mg. |
| | 800.0 mg. |

The calcium salt of (±)(cis-1,2-epoxypropyl)phosphonic acid is blended with dicalcium phosphate, lactose and 40 mg. of cornstarch. The mixture is then granulated with a 15 percent cornstarch paste, rough-screened, dried at 45° C. and screened through a No. 16 screen. Additional cornstarch (40 mg.) and magnesium stearate are added and the mixture compressed into one-half inch diameter tablets each weighing about 800 mg.

By substituting 330 mg. of the disodium salt of (±) (cis-1,2-epoxypropyl)phosphonic acid monohydrate for the calcium salt of (±)(cis-1,2-epoxypropyl)phosphonic acid recited in the above example and otherwise following the procedure described therein, a similar tablet suitable for oral administration is obtained.

It will be apparent from the foregoing description that the (cis-1,2-epoxypropyl)phosphonic acid products (I) of this invention constitute a valuable class of compounds which have not been prepared heretofore. One skilled in the art will also appreciate that the process disclosed in the above examples are merely illustrative and are capable of a wide variation and modification without departing from the spirit of this invention.

What is claimed is:

1. A method for the preparation of a compound having the formula:

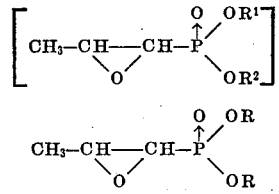

wherein R represents similar or dissimilar members selected from alkyl or aryl; which comprises treating a 2-substituted propionaldehyde of the formula: $CH_3—CHX—CHO$ wherein X is halo, with a trihydrocarbylphosphite of the formula: $P(OR)_3$ wherein R is as defined above, at reflux temperatures.

2. The process of claim 1 wherein 2-halopropionaldehyde is treated with a tri-lower alkylphosphite to afford di-lower alkyl (cis-1,2-epoxypropyl) phosphonate.

3. The process of claim 1 wherein 2-halopropionaldehyde is treated with trimethylphosphite to afford the dimethyl ester of (cis-1,2epoxypropyl) phosphonic acid.

* * * * *